United States Patent
Deng

(10) Patent No.: US 11,470,601 B2
(45) Date of Patent: Oct. 11, 2022

(54) TRANSMISSION CONTROL METHOD AND APPARATUS FOR DOWNLINK CONTROL INFORMATION, AND STORAGE MEDIUM, BASE STATION AND TERMINAL

(71) Applicant: SPREADTRUM COMMUNICATIONS (SHANGHAI) CO., LTD., Shanghai (CN)

(72) Inventor: Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 130 days.

(21) Appl. No.: 17/058,762

(22) PCT Filed: May 24, 2019

(86) PCT No.: PCT/CN2019/088222
§ 371 (c)(1),
(2) Date: Nov. 25, 2020

(87) PCT Pub. No.: WO2019/228253
PCT Pub. Date: Dec. 5, 2019

(65) Prior Publication Data
US 2021/0212034 A1    Jul. 8, 2021

(30) Foreign Application Priority Data
May 31, 2018  (CN) .......................... 201810551006.6

(51) Int. Cl.
*H04W 72/04* (2009.01)
*H04W 72/12* (2009.01)

(52) U.S. Cl.
CPC ..... *H04W 72/042* (2013.01); *H04W 72/1289* (2013.01)

(58) Field of Classification Search
CPC .................. H04W 72/1289; H04W 72/042
(Continued)

(56) References Cited

U.S. PATENT DOCUMENTS

2013/0301608 A1* 11/2013 Frenne ................ H04W 74/004
                                                                    370/328
2014/0050159 A1    2/2014 Frenne et al.
(Continued)

FOREIGN PATENT DOCUMENTS

CN         102665230 A      9/2012
CN         103582135 A      2/2014
(Continued)

OTHER PUBLICATIONS

EPO Extended European Search Report for corresponding EP Application No. 19810768.2; dated, Feb. 7, 2022.
(Continued)

*Primary Examiner* — Peter G Solinsky
(74) *Attorney, Agent, or Firm* — Cantor Colburn LLP

(57) ABSTRACT

A transmission control method and apparatus for downlink control information, and a storage medium, a base station and a terminal. The transmission control method comprises: receiving user equipment capability information sent by a user equipment, wherein the user equipment capability information comprises indication information regarding whether an enhanced CCE is supported; and according to the user equipment capability information, determining whether the enhanced CCE is to be used to schedule the user equipment, and when the enhanced CCE is used to schedule the user equipment, selecting the number of REGs contained in a single CCE from a first set, and when the enhanced CCE is not used to schedule the user equipment, selecting the number of REGs contained in a single CCE from a second set, wherein the first set is different from the second set. By (Continued)

means of the technical solution provided in the present invention, the utilization rate of resources can be improved.

20 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0092695 A1* | 4/2015 | Zhao | H04L 5/0053 370/329 |
| 2015/0181574 A1 | 6/2015 | Lee et al. | |
| 2016/0014728 A1 | 1/2016 | Seo et al. | |
| 2016/0219557 A1* | 7/2016 | He | H04L 5/0053 |
| 2017/0374569 A1 | 12/2017 | Lee et al. | |
| 2018/0084559 A1 | 3/2018 | Kim et al. | |
| 2019/0229879 A1 | 7/2019 | Yi et al. | |

FOREIGN PATENT DOCUMENTS

| | | |
|---|---|---|
| CN | 104025495 A | 9/2014 |
| CN | 104272844 A | 1/2015 |
| CN | 104584460 A | 4/2015 |
| EP | 2843986 A1 | 3/2015 |
| EP | 3166250 A1 | 5/2017 |
| EP | 3247060 A1 | 11/2017 |
| WO | 2014016672 A1 | 1/2014 |
| WO | 2018016923 A1 | 1/2018 |

OTHER PUBLICATIONS

IPIN 1st Office Action for corresponding IN Application No. 202017054275; dated Dec. 20, 2021.
Spreadtrum Communications, "Discussion on NR-REG to NR-CCE time-/frequency mapping"; 3GPP TSG-RAN #AH_NR2; Qingdao, P.R. China; (Dated Jun. 27-30, 2017), R1-1710366; 5 pages.
International Search Report for International Application No. PCT/CN2019/088222; dated Aug. 13, 2019.

* cited by examiner

UE capability information is received from a UE, wherein the UE capability information includes indication information indicating whether enhanced CCE is supported ⎯ S101 whether to use the enhanced CCE to schedule the UE is determined based on the UE capability information, wherein if the enhanced CCE is used to schedule the UE, the number of REGs included in a single CCE is selected from a first set, if the enhanced CCE is not used to schedule the UE, the number of REGs included in a single CCE is selected from a second set, and the first set is different from the second set ⎯ S102

FIG. 1

TRANSMISSION CONTROL METHOD AND APPARATUS FOR DOWNLINK CONTROL INFORMATION, AND STORAGE MEDIUM, BASE STATION AND TERMINAL

CROSS REFERENCE TO RELATED APPLICATIONS

This is the U.S. national stage of application No. PCT/CN2019/088222, filed on May 24, 2019. Priority under 35 U.S.C. § 119(a) and 35 U.S.C. § 365(b) is claimed from Chinese Application No. 201810551006.6, filed May 31, 2018, and entitled "TRANSMISSION CONTROL METHOD AND APPARATUS FOR DOWNLINK CONTROL INFORMATION, AND STORAGE MEDIUM, BASE STATION AND TERMINAL", the entire disclosure of which is also incorporated herein by reference.

TECHNICAL FIELD

The present disclosure generally relates to radio communication technology field, and more particularly, to transmission control methods and apparatuses for downlink control information, a storage medium, a base station and a terminal.

BACKGROUND

In a New Radio (NR) access system, a base station can make a User Equipment (UE) detect its own Downlink Control Information (DCI) in one or more Control Resource Sets (CORESETs) according to its Radio Network Temporary Identifier (RNTI). For example, for a scenario where carrier aggregation is not considered, if the UE works on a carrier, the base station can make the UE detect search spaces in one or more CORESETs on the carrier, detect its own DCI according to its own RNTI, and receive data or upload data according to the DCI.

Single DCI is carried by at least one Control Channel Element (CCE). The number of CCEs carrying the single DCI is called Aggregation Level (AL), and the AL may be 1, 2, 4, 8 or 16. In existing NR standards, merely a single CCE including 6 Resource Element Groups (REGs) is supported. Each REG refers to a single Resource Block (RB) that occupies an Orthogonal Frequency Division Multiplexing (OFDM) symbol duration, that is, each REG includes 12 consecutive Resource Elements (REs) in a frequency domain.

At present, if available resources to carry the DCI do not match resources required to transmit the DCI, it may cause a waste of resources, and reduce the number of UEs scheduled by a network.

SUMMARY

Embodiments of the present disclosure may improve resource utilization by providing solutions of how to transmit DCI.

In an embodiment of the present disclosure, a transmission control method for DCI is provided, including: receiving UE capability information from a UE, wherein the UE capability information includes indication information indicating whether enhanced CCE is supported; and determining whether to use the enhanced CCE to schedule the UE based on the UE capability information, wherein if the enhanced CCE is used to schedule the UE, the number of REGs included in a single CCE is selected from a first set, if the enhanced CCE is not used to schedule the UE, the number of REGs included in a single CCE is selected from a second set, and the first set is different from the second set.

Optionally, if it is determined that the enhanced CCE is used to schedule the UE, the method further includes: transmitting first configuration information or second configuration information to the UE, to indicate for the UE that the enhanced CCE is used to schedule the UE.

Optionally, the first configuration information includes at least two elements in the first set, and the second configuration information includes a single element in the first set.

Optionally, the first set is {4, 8, 10}.

Optionally, the first configuration information further includes a DCI format associated with each of the at least two elements, and the second configuration information further includes a DCI format associated with the single element.

Optionally, the first configuration information further includes a control resource set and/or a search space associated with each of the at least two elements, and the second configuration information further includes a control resource set and/or a search space associated with the single element.

Optionally, after transmitting the first configuration information, the method further includes: receiving a measurement report from the UE; determining the number of the REGs included in the single CCE based on the measurement report; and transmitting third configuration information to the UE, so that the UE decodes the DCI based on the third configuration information, wherein the third configuration information includes the number of the REGs included in the single CCE.

Optionally, transmitting third configuration information to the UE includes: transmitting the third configuration information to the UE based on Media Access Control (MAC) layer control element signaling.

Optionally, before transmitting the second configuration information, the method further includes: receiving a measurement report from the UE; and determining the number of the REGs included in the single CCE based on the measurement report and the UE capability information.

Optionally, the UE operates on a plurality of serving cells, and transmitting first configuration information or second configuration information to the UE includes: transmitting the first configuration information or the second configuration information to the UE on at least one of the plurality of serving cells.

Optionally, the first configuration information or the second configuration information is transmitted through Radio Resource Control (RRC) signaling.

Optionally, the second set is {6}.

In an embodiment of the present disclosure, a transmission control method for DCI is provided, including: a UE transmitting UE capability information to a network, wherein the UE capability information includes indication information indicating whether enhanced CCE is supported; and if the network determines to use the enhanced CCE to schedule based on the UE capability information, using the enhanced CCE to decode the DCI, wherein if the enhanced CCE is used to decode the DCI, the number of REGs included in a single CCE is selected from a first set, if the enhanced CCE is not used to decode the DCI, the number of REGs included in a single CCE is selected from a second set, and the first set is different from the second set.

Optionally, before using the enhanced CCE to decode the DCI, the method further includes: receiving first configuration information or second configuration information from the network.

Optionally, the first configuration information includes at least two elements in the first set, and the second configuration information includes a single element in the first set.

Optionally, the first set is {4, 8, 10}.

Optionally, the first configuration information further includes a DCI format associated with each of the at least two elements, and the second configuration information further includes a DCI format associated with the single element.

Optionally, the first configuration information further includes a control resource set and/or a search space associated with each of the at least two elements, and the second configuration information further includes a control resource set and/or a search space associated with the single element.

Optionally, after receiving the first configuration information, the method further includes: transmitting a measurement report to the network, so that the network determines the number of the REGs included in the single CCE; and receiving third configuration information from the network to decode the DCI, wherein the third configuration information includes the number of the REGs included in the single CCE.

Optionally, receiving third configuration information from the network includes: receiving the third configuration information from the network based on MAC layer control element signaling.

Optionally, before receiving the second configuration information, the method further includes: transmitting a measurement report to the network, so that the network determines the number of the REGs included in the single CCE based on the measurement report and the UE capability information.

Optionally, the UE operates on a plurality of serving cells, and receiving first configuration information or second configuration information from the network includes: receiving the first configuration information or the second configuration information from the network on at least one of the plurality of serving cells.

Optionally, the first configuration information or the second configuration information is transmitted through RRC signaling.

Optionally, the second set is {6}.

In an embodiment of the present disclosure, a transmission control apparatus for DCI is provided, including: a first receiving circuitry, configured to receive UE capability information from a UE, wherein the UE capability information includes indication information indicating whether enhanced CCE is supported; and a first determining circuitry, configured to determine whether to use the enhanced CCE to schedule the UE based on the UE capability information, wherein if the enhanced CCE is used to schedule the UE, the number of REGs included in a single CCE is selected from a first set, if the enhanced CCE is not used to schedule the UE, the number of REGs included in a single CCE is selected from a second set, and the first set is different from the second set.

In an embodiment of the present disclosure, a transmission control apparatus for DCI is provided, including: a first transmitting circuitry, configured to transmit UE capability information to a network, wherein the UE capability information includes indication information indicating whether enhanced CCE is supported; and a decoding circuitry, configured to: if the network determines to use the enhanced CCE to schedule based on the UE capability information, use the enhanced CCE to decode the DCI, wherein if the enhanced CCE is used to decode the DCI, the number of REGs included in a single CCE is selected from a first set, if the enhanced CCE is not used to decode the DCI, the number of REGs included in a single CCE is selected from a second set, and the first set is different from the second set.

In an embodiment of the present disclosure, a storage medium having computer instructions stored therein is provided, wherein when the computer instructions are executed, any one of the above methods is performed.

In an embodiment of the present disclosure, a base station including a memory and a processor is provided, wherein the memory has computer instructions stored therein, and when the processor executes the computer instructions, the above first method is performed.

In an embodiment of the present disclosure, a terminal including a memory and a processor is provided, wherein the memory has computer instructions stored therein, and when the processor executes the computer instructions, the above second method is performed.

Embodiments of the present disclosure may provide following advantages.

Embodiments of the present disclosure provide a transmission control method for DCI, including: receiving UE capability information from a UE, wherein the UE capability information includes indication information indicating whether enhanced CCE is supported; and determining whether to use the enhanced CCE to schedule the UE based on the UE capability information, wherein if the enhanced CCE is used to schedule the UE, the number of REGs included in a single CCE is selected from a first set, if the enhanced CCE is not used to schedule the UE, the number of REGs included in a single CCE is selected from a second set, and the first set is different from the second set. With the embodiments, CCEs including different numbers of REGs are provided, so that the network can flexibly select CCEs to schedule UEs based on channel transmission quality, which enables to use fewer resources to schedule UEs to improve resource utilization. As a result, under a same resource condition, the number of UEs scheduled by the network is increased.

Further, the first set is {4, 8, 10}. With the embodiments, the number of the REGs included in the single CCE when the enhanced CCE is used to schedule UE is provided, which may further reduce complexity of decoding the DCI by the UE.

Further, the first configuration information further includes a DCI format associated with each of the at least two elements, and the second configuration information further includes a DCI format associated with the single element. With the embodiments, the DCI format for enhanced CCE decoding is provided, so that the UE uses the enhanced CCE to decode merely in the DCI format, and still use an existing CCE to decode in other DCI formats, thereby improving decoding efficiency.

Further, the third configuration information is transmitted to the UE based on MAC layer control element signaling. With the embodiments, the UE may rapidly determine the number of the REGs included in the single CCE after receiving the third configuration information, which may improve decoding efficiency of the DCI.

BRIEF DESCRIPTION OF THE DRAWINGS

FIG. 1 is a flow chart of a transmission control method for DCI according to an embodiment;

DETAILED DESCRIPTION

Figure 2:
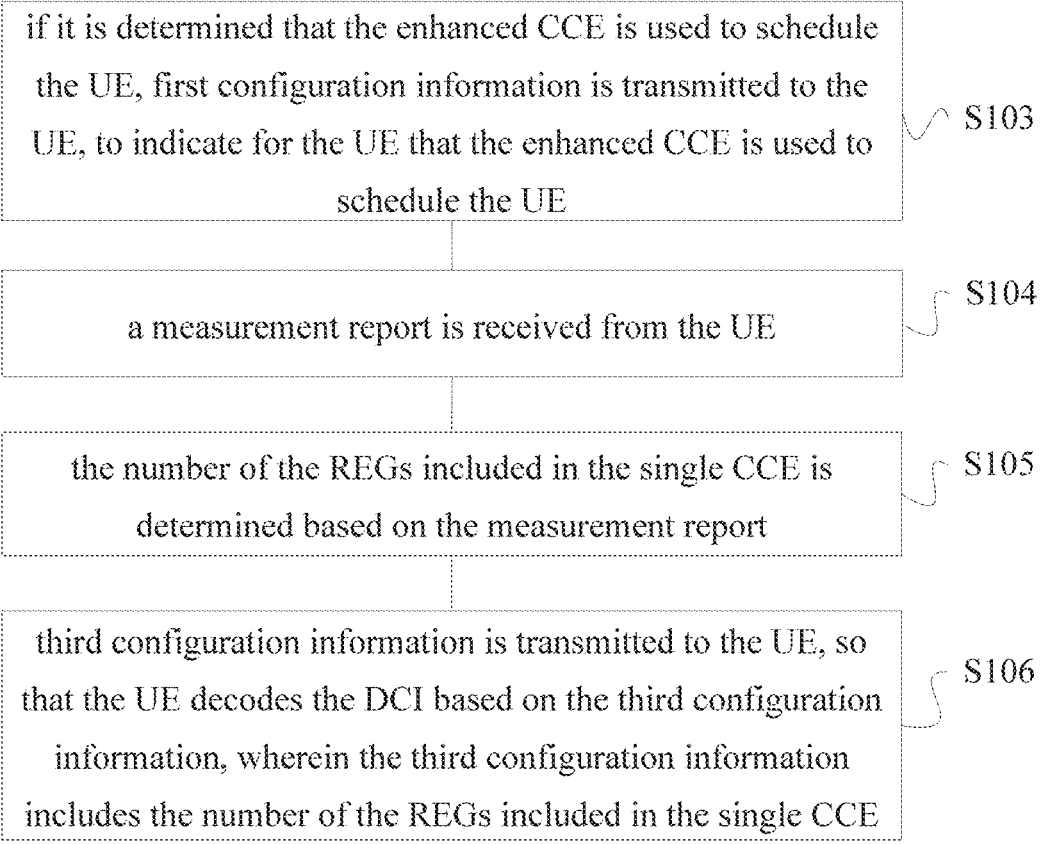
FIG. 2 is a flow chart of a transmission control method for DCI according to an embodiment.

As described in the background, available resources to carry DCI may not match resources required to transmit the DCI, which causes a waste of resources, and reduce the number of UEs scheduled by a network.

The inventor found that in existing NR standards, among 6 REGs included in a single CCE, 12 REs in each REG include at least one demodulation reference signal. If the demodulation reference signal is removed, less than 12 REs in each REG are used for transmitting DCI. For example, assuming that the demodulation reference signals in each REG are 3 REs, there are 9 remaining REs, and the number of REs for transmitting DCI in each CCE is (6×9=54).

In Long Term Evolution (LTE) systems, one DCI is composed of at least one CCE, one CCE is composed of 9 REGs, and each REG includes 4 consecutive REs in frequency. Therefore, in the LTE systems, the number of effective REs used to transmit DCI in a CCE are (4×9=36). Compared with NR systems, the number of REs used to transmit DCI in the LTE systems is relatively small.

In practice, the number of DCI bits that need to be transmitted in the NR systems and that in the LTE systems are almost the same sometimes. However, the NR systems use more REs to transmit DCI, thereby causing a waste of resources. Besides, under the same resource condition, the number of UEs scheduled by the network is reduced. In addition, as a single CCE in the NR systems occupies more resources (that is, granularity is greater), a larger aggregation level (for example, the aggregation level is 4, 8 or 16) is required, which consumes more transmission resources.

Embodiments of the present disclosure provide a transmission control method for DCI, including: receiving UE capability information from a UE, wherein the UE capability information includes indication information indicating whether enhanced CCE is supported; and determining whether to use the enhanced CCE to schedule the UE based on the UE capability information, wherein if the enhanced CCE is used to schedule the UE, the number of REGs included in a single CCE is selected from a first set, if the enhanced CCE is not used to schedule the UE, the number of REGs included in a single CCE is selected from a second set, and the first set is different from the second set. With the embodiments, CCEs including different numbers of REGs are provided, so that the network can flexibly select CCEs to schedule UEs based on channel transmission quality, which enables to use fewer resources to schedule UEs to improve resource utilization. As a result, under a same resource condition, the number of UEs scheduled by the network is increased.

In order to clarify the objects, characteristics and advantages of the disclosure, embodiments of present disclosure will be described in detail in conjunction with accompanying drawings.

FIG. 1 is a flow chart of a transmission control method for DCI according to an embodiment. The method may be applied at a network side, e.g., performed by a base station at the network side. Referring to FIG. 1, the method may include S101 and S102.

In S101, UE capability information is received from a UE, wherein the UE capability information includes indication information indicating whether enhanced CCE is supported.

In S102, whether to use the enhanced CCE to schedule the UE is determined based on the UE capability information, wherein if the enhanced CCE is used to schedule the UE, the number of REGs included in a single CCE is selected from a first set, if the enhanced CCE is not used to schedule the UE, the number of REGs included in a single CCE is selected from a second set, and the first set is different from the second set.

In some embodiments, in S101, in an NR system, an idle UE accesses a cell (for example, a serving cell) and sets up an RRC connection with the base station at the network side (for example, an NR base station, also called NR gNB). In a process of the UE accessing the network, the base station allocates a C-RNTI for the UE.

When the UE initially accesses the base station, the DCI used by the base station to schedule the UE may include one or more CCEs, wherein the CCEs may be standard CCEs, and a single standard CCE includes 6 REGs.

After the UE sets up the RRC connection, the base station may request the UE to report its UE capability information, and then receive the UE capability information from the UE. The UE capability information may include indication information indicating whether enhanced CCE is supported.

In S102, the base station may determine whether to use the enhanced CCE to configure DCI for the UE based on the UE capability information reported by the UE.

In some embodiments, if the UE supports the enhanced CCE, and the base station uses standard CCE (that is, a CCE including 6 REGs) rather than the enhanced CCE to configure DCI, the base station may ignore the UE capability information reported by the UE which indicates that the enhanced CCE is supported, and continues to configure and transmit DCI to the UE following an existing NR standard. Accordingly, the UE may use the standard CCE to decode the DCI.

If the base station does not use the enhanced CCE to schedule the UE, that is, if the base station uses the standard CCE to schedule, and if the number of REGs included in the standard CCE is in the second set, an element may be selected from the second set to determine the number of REGs. It should be noted that in the current NR standard, the second set has only one element '6', that is, a single standard CCE includes 6 REGs.

Alternatively, if the UE supports enhanced CCE, and the base station determines to use enhanced CCE to configure DCI for the UE, the base station may send RRC signaling to notify the UE that enhanced CCE is used to schedule the UE, when using enhanced CCE to schedule the UE. In some embodiments, the RRC signaling may include the number of REGs included in a single enhanced CCE when the enhanced CCE is used to configure the DCI.

After the UE receiving configuration information carried in the RRC signaling (for example, including the configuration information of using the enhanced CCE to schedule the UE), the UE may immediately adopt the enhanced CCE to decode the DCI. In this case, when the UE detecting the DCI, the UE may use configuration of a single CCE including non-six REGs to decode the DCI scrambled with C-RNTI.

Further, if the RRC signaling does not explicitly indicate the number of REGs included in a single CCE, the UE may blindly detect possible combinations. As the optional numbers of REGs are limited (for example, when enhanced CCE is used, a single CCE may include 4 REGs, 8 REGs or 10 REGs), the UE can determine the number of REGs actually included in a single CCE through blind detection of the possible combinations. Alternatively, a standard may stipulate the number of REGs included in the enhanced CCE. Alternatively, if the base station explicitly indicates the number of REGs used by the enhanced CCE, the UE may use a single CCE corresponding to the indicated number to decode the DCI. In some embodiments, referring to FIG. 2, a process of the base station determining the number of REGs included in a single CCE may include S103, S104, S105 and S106.

In S103, if it is determined that the enhanced CCE is used to schedule the UE, first configuration information is transmitted to the UE, to indicate for the UE that the enhanced CCE is used to schedule the UE.

In S104, a measurement report is received from the UE.

In S105, the number of the REGs included in the single CCE is determined based on the measurement report.

In S106, third configuration information is transmitted to the UE, so that the UE decodes the DCI based on the third configuration information, wherein the third configuration information includes the number of the REGs included in the single CCE.

In some embodiments, in S103, if the base station determines to use the enhanced CCE to schedule the UE, the base station may transmit the first configuration information to the UE. The first configuration information may be transmitted to the UE through RRC signaling. By transmitting the first configuration information, the UE is able to know that enhanced CCE needs to be used to decode DCI.

In some embodiments, if the base station determines that the enhanced CCE is used to transmit DCI, the base station may configure the first configuration information for the UE through RRC signaling. The first configuration information may include multiple sets of parameter configuration where the numbers of REGs included in a single CCE are different. For example, a first set of parameter configuration corresponds to a way that a single CCE includes 4 REGs, while a second set of parameter configuration corresponds to a way that a single CCE includes 8 REGs. For another example, a first set of parameter configuration corresponds to a way that a single CCE includes 4 REGs, a second set of parameter configuration corresponds to a way that a single CCE includes 8 REGs, and a third set of parameter configuration corresponds to a way that a single CCE includes 10 REGs. Those skilled in the art could understand that variation can be made according to practical requirements.

Further, when the enhanced CCE is used to schedule the UE, the number of REGs included in a single CCE may be placed in the first set, for example, the first set is {4, 8, 10}. Accordingly, the number of REGs included in the standard CCE can be placed in the second set, for example, the second set is {6}.

After receiving the first configuration information, the UE learns that the base station may use enhanced CCE to transmit DCI. Those skilled in the art could understand that when receiving the first configuration information, the UE may save relevant parameter configuration but not immediately using the relevant parameter configuration to decode the DCI.

In S104, the base station may receive the measurement report from the UE, which enables the base station to know channel quality of the UE. Specifically, the measurement report may include channel state information between the UE and the base station, for example, it may be Channel Quality Indicator (CQI) information.

In S105, the base station may determine whether the enhanced CCE is used by the DCI scheduling the UE, and which set of parameter configuration is used, based on the channel quality of the UE, the number of DCI bits to be transmitted, and a load status. The parameter configuration may include, for example, the number of REGs included in a single CCE when the enhanced CCE is used.

In S106, if the base station determines that the enhanced CCE is used to configure the DCI, the base station may transmit the third configuration information to the UE, so that the UE decodes the DCI based on the third configuration information. The third configuration information may be transmitted to the UE through a MAC Control Element (CE). The third configuration information transmitted through the MAC CE may be rapidly received by the UE, so that the UE may rapidly perform subsequent operations based on the third configuration information.

In some embodiments, the third configuration information may clarify the number of REGs included in a single CCE, so that the UE can know the parameter configuration determined by the base station. For example, the third configuration information may indicate using parameter configuration of a single CCE including 4 REGs, or indicate using parameter configuration of a single CCE including 8 REGs, or indicate using parameter configuration of a single CCE including 10 REGs.

Afterward, the UE may use enhanced CCE to decode DCI. For example, the CCE including 4 REGs is used to decode the DCI, or, the CCE including 8 REGs is used to decode the DCI, or, the CCE including 10 REGs is used to decode the DCI.

Figure 3:
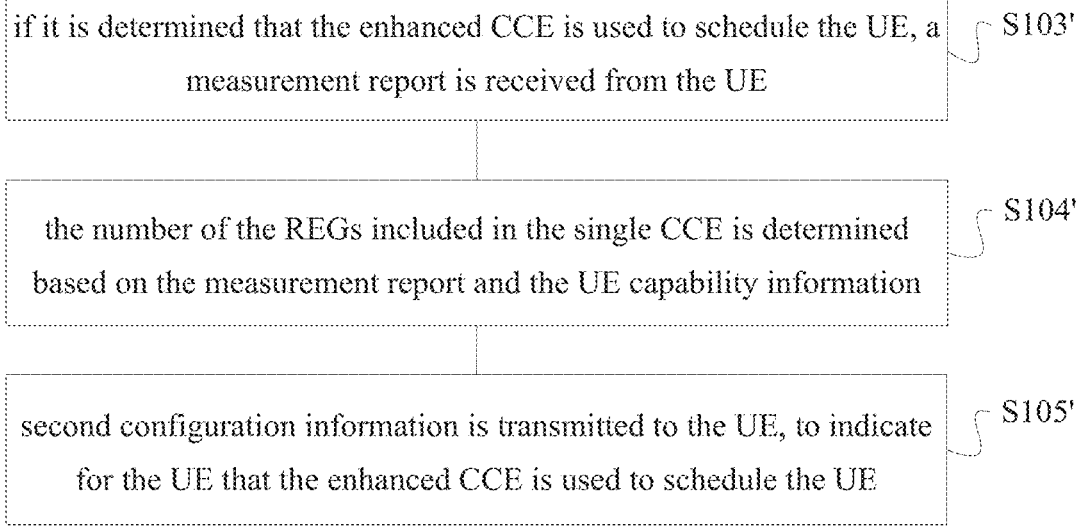
FIG. 3 is a flow chart of a transmission control method for DCI according to an embodiment.

Alternatively, in some embodiments, referring to FIG. 3, a process of the base station determining the number of REGs included in a single CCE may include S103', S104' and S105'.

In S103', if it is determined that the enhanced CCE is used to schedule the UE, a measurement report is received from the UE.

In S104', the number of the REGs included in the single CCE is determined based on the measurement report and the UE capability information.

In S105', second configuration information is transmitted to the UE, to indicate for the UE that the enhanced CCE is used to schedule the UE.

In some embodiments, in S103', if it is determined that the enhanced CCE is used to schedule DCI for the UE, the base station may receive the measurement report from the UE. The measurement report may include channel state information between the UE and the base station, that is, the UE measures a reference signal transmitted by the base station to obtain the channel state information of the UE at the base station. The channel state information may be CQI information or Reference Signal Receiving Power (RSRP).

In S104', the base station may determine the number of REGs included in a single CCE for the UE based on the measurement report and the UE capability information reported by the UE. For example, the number may be 4, 8 or 10.

In some embodiments, the base station may learn from the measurement report reported by the UE that the channel quality of the UE is relatively high. For example, if signal quality of a serving cell measured by the UE is higher than a first preset threshold, the base station may schedule the UE in a manner that a single CCE includes 4 REGs. Compared with the standard CCE including 6 REGs, the enhanced CCE including 4 REGs may save resources, and surplus resources can be used for transmitting other data or for scheduling other UEs.

In some embodiments, the base station may learn from the measurement report reported by the UE that the channel quality of the UE is low. For example, if the signal quality of the serving cell measured by the UE is lower than a second preset threshold, more REGs need to be used to carry the DCI. If the standard CCE (that is, 6 REGs) is used, a convergence level needs to be 2 (that is, 12 REGs) to carry the DCI. However, the base station may determine that only 8 REGs are required to carry the DCI according to the channel quality reported by the UE and the number of the DCI bits to be transmitted. In this case, the base station may use the enhanced CCE for scheduling, for example, a single CCE including 8 REGs to schedule the UE, thereby saving resources and improving resource utilization.

In S105', the base station may transmit the second configuration information to instruct the UE to use the enhanced CCE to decode the DCI. The second configuration information may include the number of REGs which is equal to one element in the first set.

Further, the second configuration information may be transmitted through RRC signaling. Those skilled in the art could understand that the number of REGs included in a single CCE when the enhanced CCE is used to schedule the UE may not be 6, but other values. More details may be referred to FIG. 2, and are not described here.

Afterward, the UE may detect DCI of CORESETs. Each CORESET may have one or more search space sets. Therefore, the network may configure for the UE the number of blind detection times for the search space on each CORESET to ensure that a maximum number of blind detection times does not exceed capability of the UE or a maximum number of blind detection times for a single carrier of the UE set by a system.

Further, if the base station instructs the UE to use enhanced CCE to decode DCI through RRC signaling, the base station may also indicate a DCI format associated with the enhanced CCE. If the base station also indicates the associated DCI format, the UE may use the enhanced CCE to decode the DCI merely when detecting the DCI format. The DCI format may include one type of DCI format or multiple types of DCI formats.

Further, the base station may indicate, through RRC signaling, a CORESET and/or a search space corresponding to the enhanced CCE when the UE uses the enhanced CCE to decode the DCI. The UE merely uses the enhanced CCE to decode the DCI in the CORESET and/or search space associated with the enhanced CCE.

It should be noted that if the associated DCI format, and the associated CORESET and/or search space indicated by the base station may be transmitted through the first configuration information or the second configuration information.

In some embodiments, the UE may detect its own DCI in one or more configured CORESETs. The current NR standards stipulate that each CORESET can include two search spaces: a common search space and a UE-specific search space. In the search space, the UE performs blind detection and decoding on DCI according to the NR standards. For example, the UE may detect DCI according to its own RNTI.

Each UE may have one or more RNTIs. The UE does not need to detect the DCI scrambled by each RNTI in the search space on each time slot. For different search spaces on the same CORESET, the UE may have different detection periods. The network may make the UE to detect the search space in the detection period to detect DCI in the common search space and the UE-specific search space.

Further, the base station may configure the DCI format associated with the enhanced CCE for the UE. If the base station configures the DCI format associated with the enhanced CCE for the UE, the UE may use the enhanced CCE for decoding merely when decoding the DCI format.

In some embodiments, if the base station configures that a single CCE includes 4 REGs, the UE may use configuration of a single CCE including 4 REGs to decode the DCI. Further, if the DCI includes 4 CCEs, the DCI includes 16 REGs in total. If the base station indicates that a single CCE including 4 REGs is merely applicable to DCI 1A, the UE may use configuration of a single CCE including 4 REGs to decode the DCI 1A, and still use configuration of a single CCE including 6 REGs to decode DCI of other formats.

Further, the base station may configure CORESET associated with the enhanced CCE for the UE. If the base station configures the CORESET associated with the enhanced CCE for the UE, the UE may use the enhanced CCE to decode the DCI merely in the CORESET corresponding to the enhanced CCE.

Further, the base station may configure a search space associated with the enhanced CCE for the UE. If the base station configures the search space associated with the enhanced CCE for the UE, the UE may use the enhanced CCE to decode the DCI merely in the associated search space. Each search space may be represented by a search space set. Take the 3rd Generation Partnership Project (3GPP) release 15 (Release 15) as an example. For a serving cell, a maximum number of CORESETs configured for a UE is 3, and a maximum number of search space sets configured for a UE is 10. If the base station configures the search space associated with the enhanced CCE for the UE, complexity of DCI blind detection may be greatly reduced.

Further, after the DCI is obtained by decoding, the UE may transmit and receive data according to the DCI.

It should be noted that after a period of time, if the base station determines not to use a single CCE including 4 REGs to schedule the UE, the base station may notify the UE to adjust the CCE format corresponding to the UE through RRC signaling (for example, the second configuration information). For example, the base station notifies the UE through RRC signaling to use the standard CCE to decode DCI. After receiving the RRC signaling, the UE may restore the configuration that a single CCE includes 6 REGs when decoding the DCI. For another example, the base station notifies the UE through RRC signaling to use a CCE including 8 REGs to decode the DCI. After receiving the RRC signaling, the UE may use a configuration that a single CCE includes 8 REGs to decode the DCI.

Alternatively, if the base station configures multiple sets of parameter configuration for the UE (for example, transmitted to the UE through the first configuration information), the base station may determine whether to continue to use the enhanced CCE to schedule the UE based on a channel condition or the like. If the base station still uses the enhanced CCE to schedule the UE, but needs to adjust the number of REGs included in a single CCE, or adjust the configuration such as the DCI format associated with the enhanced CCE, it may be adjusted through MAC CE. For example, the MAC CE is used to instruct the UE to adjust the DCI format associated with the enhanced CCE.

Further, if the UE uses carrier aggregation, the UE can operate on multiple serving cells, corresponding to a primary cell and a secondary cell, or, corresponding to a primary cell and multiple secondary cells. In this case, the base station may configure using enhanced CCE (that is, a single CCE includes non-six REGs) to schedule the UE for different serving cells. Further, if the base station uses enhanced CCE to schedule the UE on one of the serving cells of the UE, the UE may use the enhanced CCE to decode when decoding the DCI on the serving cell. More details may be referred to FIG. 1 to FIG. 3, and are not described here.

Figure 4:
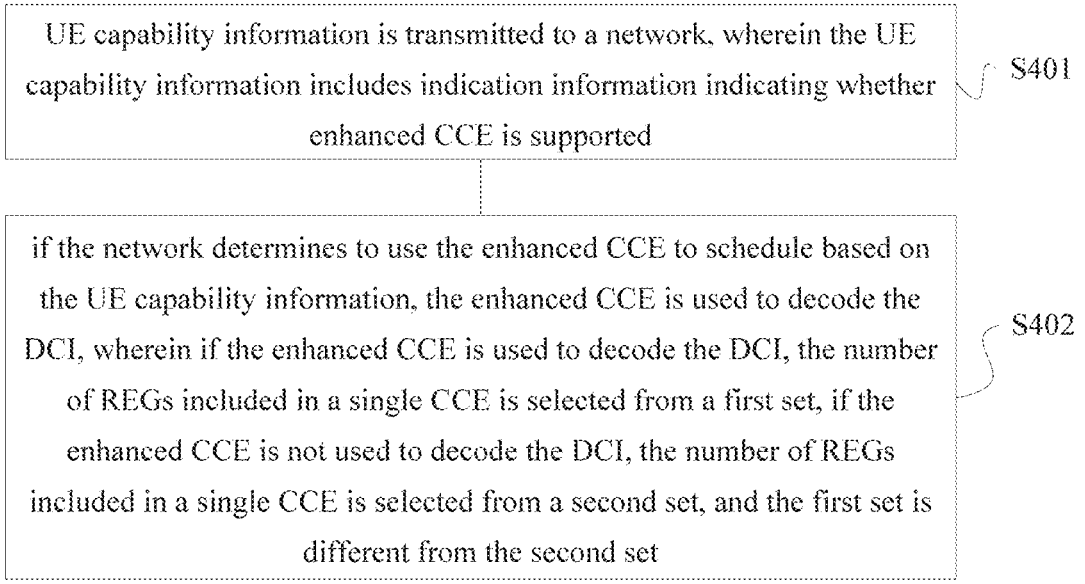
FIG. 4 is a flow chart of a transmission control method for DCI according to an embodiment.

FIG. 4 is a flow chart of a transmission control method for DCI according to an embodiment. The method may be applied at a UE. Referring to FIG. 4, the method may include S401 and S402.

In S401, UE capability information is transmitted to a network, wherein the UE capability information includes indication information indicating whether enhanced CCE is supported.

In S402, if the network determines to use the enhanced CCE to schedule based on the UE capability information, the enhanced CCE is used to decode the DCI, wherein if the enhanced CCE is used to decode the DCI, the number of REGs included in a single CCE is selected from a first set, if the enhanced CCE is not used to decode the DCI, the number of REGs included in a single CCE is selected from a second set, and the first set is different from the second set.

In some embodiments, in S401, after accessing the network, the UE may transmit UE capability information to the network. The UE capability information may include indication information indicating whether the enhanced CCE is supported.

In S402, when the network determines that the enhanced CCE is used for scheduling based on the UE capability information, the network may notify the UE to use the enhanced CCE to decode DCI through RRC signaling.

If the UE uses enhanced CCE for decoding, the number of REGs included in a single CCE is selected from the first set, and the first set is {4, 8, 10}. If the enhanced CCE is not used for decoding, the number of REGs included in a single CCE is selected from the second set, and the second set is {6}.

Further, if the RRC signaling does not explicitly indicate the number of REGs included in a single CCE, the UE may use blind detection to decode the DCI. As optional numbers of REGs are limited, for example, a single CCE including 4 REGs, 8 REGs or 10 REGs, the UE may blindly detect all possible combinations to determine the number of REGs included in a single CCE, or standards stipulate the number of REGs included in the enhanced CCE.

Further, the network may transmit the first configuration information through RRC signaling. The first configuration information may include at least two elements in the first set.

In some embodiments, the first configuration information further includes a DCI format associated with each of the at least two elements. In some embodiments, the first configuration information further includes a control resource set and/or a search space associated with each of the at least two elements.

In some embodiments, after receiving the first configuration information, the UE may transmit a measurement report to the network, so that the network determines the number of the REGs included in the single CCE; and receive third configuration information from the network to decode the DCI, wherein the third configuration information includes the number of the REGs included in the single CCE. The third configuration information may be received from the network based on MAC layer control element signaling.

Alternatively, the network may transmit the second configuration information through RRC signaling. The second configuration information includes a single element in the first set.

In some embodiments, the second configuration information further includes a DCI format associated with the single element. In some embodiments, the second configuration information further includes a control resource set and/or a search space associated with the single element.

Further, to improve resource utilization, before receiving the second configuration information, the UE may transmit a measurement report to the network, so that the network determines the number of the REGs included in the single CCE based on the measurement report and the UE capability information. Afterward, the network may configure the number of REGs included in a single CCE in the second configuration information to be transmitted to the UE.

Further, if the UE uses carrier aggregation, the UE can operate on multiple serving cells, corresponding to a primary cell and a secondary cell, or, corresponding to a primary cell and multiple secondary cells. In this case, the base station may configure using enhanced CCE (that is, a single CCE includes non-six REGs) to schedule the UE for different serving cells. Further, if the base station uses enhanced CCE to schedule the UE on one of the serving cells of the UE, the UE may use the enhanced CCE to decode when decoding the DCI on the serving cell.

Those skilled in the art could understand that S401 to S402 correspond to S101 to S102 in the embodiment as shown in FIG. 1, and specific implementation principles and logic of S401 to S402 are complementary to those of S101 to S102. Therefore, more details about the method applied on the UE may be referred to related descriptions of the embodiments as shown in FIG. 1 to FIG. 3, and are not described here.

From above, with the methods provided in the embodiments, CCEs including different numbers of REGs are provided, which enables to use fewer resources to schedule UEs to improve resource utilization. As a result, under a same resource condition, the number of UEs scheduled by the network is increased.

Figure 5:
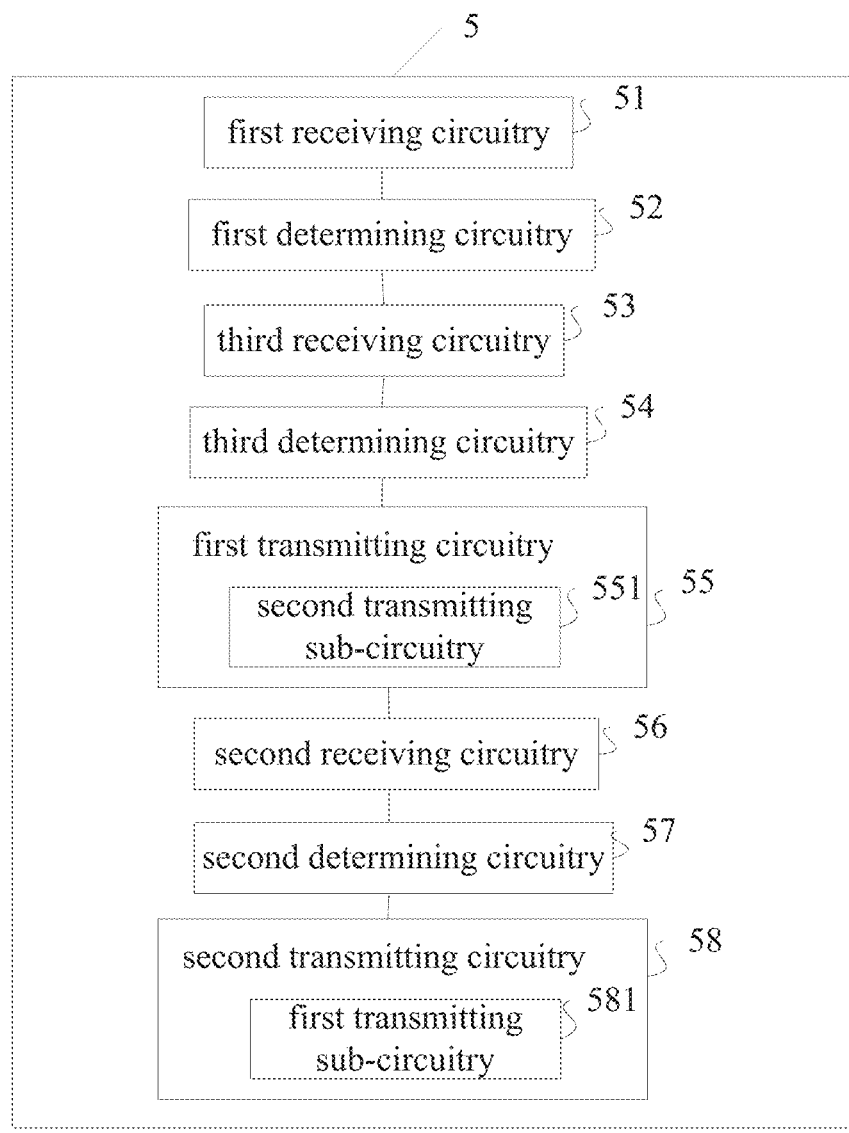
FIG. 5 is a structural diagram of a transmission control apparatus for DCI according to an embodiment.

FIG. 5 is a structural diagram of a transmission control apparatus for DCI according to an embodiment. The transmission control apparatus 5 is applied on a base station at a network side, and configured to perform the method as shown in FIG. 1 to FIG. 3.

In some embodiments, the transmission control apparatus 5 includes: a first receiving circuitry 51, configured to receive UE capability information from a UE, wherein the UE capability information includes indication information indicating whether enhanced CCE is supported; and a first determining circuitry 52, configured to determine whether to use the enhanced CCE to schedule the UE based on the UE capability information, wherein if the enhanced CCE is used to schedule the UE, the number of REGs included in a single CCE is selected from a first set, if the enhanced CCE is not used to schedule the UE, the number of REGs included in a single CCE is selected from a second set, and the first set is different from the second set. The first set is {4, 8, 10}, and the second set is {6}.

In some embodiments, the transmission control apparatus 5 further includes a first transmitting circuitry 55 configured to: if it is determined that the enhanced CCE is used to schedule the UE, transmit first configuration information or second configuration information to the UE, to indicate for the UE that the enhanced CCE is used to schedule the UE.

In some embodiments, the first configuration information includes at least two elements in the first set, and the second configuration information includes a single element in the first set.

In some embodiments, the first configuration information further includes a DCI format associated with each of the at least two elements, and the second configuration information further includes a DCI format associated with the single element. The first configuration information or the second configuration information is transmitted through RRC signaling.

In some embodiments, the first configuration information further includes a control resource set and/or a search space associated with each of the at least two elements, and the second configuration information further includes a control resource set and/or a search space associated with the single element.

In some embodiments, the transmission control apparatus 5 further includes: a second receiving circuitry 56 configured to: after the first configuration information is transmitted, receive a measurement report from the UE; a second determining circuitry 57 configured to determine the number of the REGs included in the single CCE based on the measurement report; and a second transmitting circuitry 58 configured to: transmit third configuration information to the UE, so that the UE decodes the DCI based on the third configuration information, wherein the third configuration information includes the number of the REGs included in the single CCE.

In some embodiments, the second transmitting circuitry 58 includes a first transmitting sub-circuitry 581 configured to transmit the third configuration information to the UE based on MAC layer control element signaling.

In some embodiments, the transmission control apparatus 5 further includes: a third receiving circuitry 53 configured to: before the second configuration information is transmitted, receive a measurement report from the UE; and a third determining circuitry 54 configured to determine the number of the REGs included in the single CCE based on the measurement report and the UE capability information.

In some embodiments, the UE operates on a plurality of serving cells, and the first transmitting circuitry 55 includes a second transmitting sub-circuitry 551 configured to transmit the first configuration information or the second configuration information to the UE on at least one of the plurality of serving cells.

More details of working principles and working modes of the transmission control apparatus 5 can be found in the above descriptions of FIG. 1 to FIG. 3, and are not described here.

Figure 6:
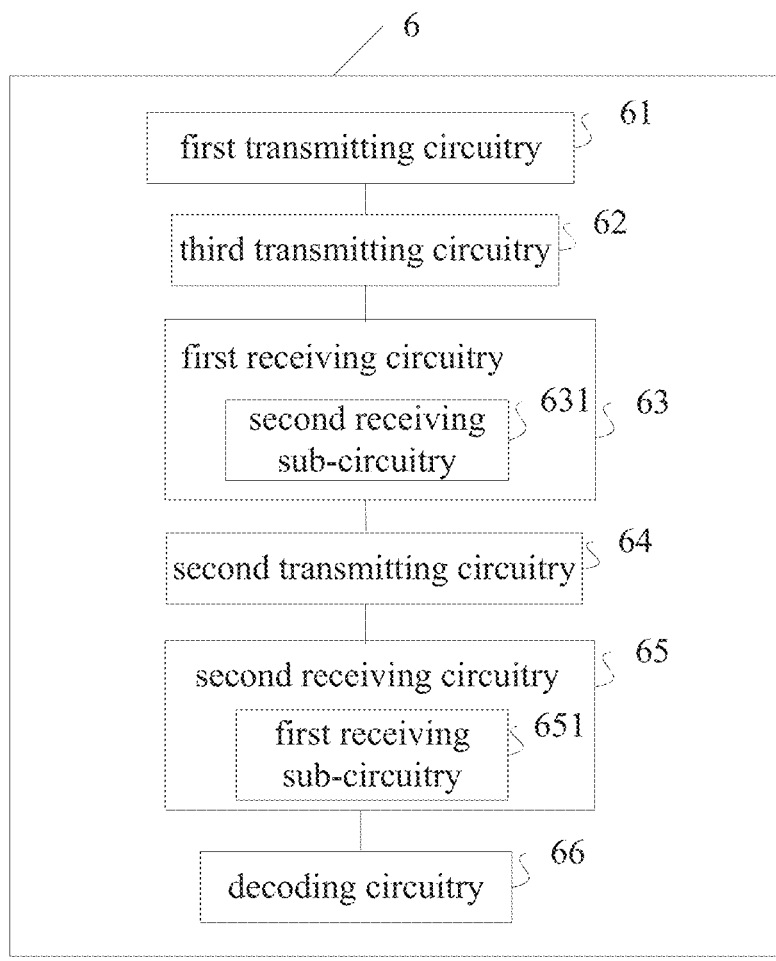
FIG. 6 is a structural diagram of a transmission control apparatus for DCI according to an embodiment.

FIG. 6 is a structural diagram of a transmission control apparatus for DCI according to an embodiment. The transmission control apparatus 6 is applied on a UE, and configured to perform the method as shown in FIG. 4.

In some embodiments, the transmission control apparatus 6 includes: a first transmitting circuitry 61, configured to transmit UE capability information to a network, wherein the UE capability information includes indication information indicating whether enhanced CCE is supported; and a decoding circuitry 66, configured to: if the network determines to use the enhanced CCE to schedule based on the UE capability information, use the enhanced CCE to decode the DCI, wherein if the enhanced CCE is used to decode the DCI, the number of REGs included in a single CCE is selected from a first set, if the enhanced CCE is not used to decode the DCI, the number of REGs included in a single CCE is selected from a second set, and the first set is different from the second set. The first set is {4, 8, 10}, and the second set is {6}.

In some embodiments, the transmission control apparatus 6 further includes a first receiving circuitry 63 configured to: before the enhanced CCE is used to decode the DCI, receive first configuration information or second configuration information from the network. The first configuration information includes at least two elements in the first set, and the second configuration information includes a single element in the first set.

In some embodiments, the first configuration information further includes a DCI format associated with each of the at least two elements, and the second configuration information further includes a DCI format associated with the single element.

In some embodiments, the first configuration information further includes a control resource set and/or a search space associated with each of the at least two elements, and the second configuration information further includes a control resource set and/or a search space associated with the single element.

In some embodiments, the transmission control apparatus 6 further includes: a second transmitting circuitry 64 configured to: after the first configuration information is received, transmit a measurement report to the network, so that the network determines the number of the REGs included in the single CCE; and a second receiving circuitry 65 configured to receive third configuration information from the network to decode the DCI, wherein the third configuration information includes the number of the REGs included in the single CCE.

In some embodiments, the second receiving circuitry 65 includes a first receiving sub-circuitry 651 configured to receive the third configuration information from the network based on MAC layer control element signaling.

In some embodiments, the transmission control apparatus 6 further includes a third transmitting circuitry 62 configured to: before the second configuration information is received, transmit a measurement report to the network, so that the network determines the number of the REGs included in the single CCE based on the measurement report and the UE capability information.

In some embodiments, the UE operates on a plurality of serving cells, and the first receiving circuitry 63 includes a second receiving sub-circuitry 631 configured to receive the first configuration information or the second configuration information from the network on at least one of the plurality of serving cells.

In some embodiments, the first configuration information or the second configuration information is transmitted through RRC signaling.

More details of working principles and working modes of the transmission control apparatus 6 can be found in the above descriptions of FIG. 4, and are not described here.

Hereinafter, signaling interaction between a UE and a network (e.g., an NR base station) according to an embodiment is described in conjunction with typical application scenarios.

Figure 7:
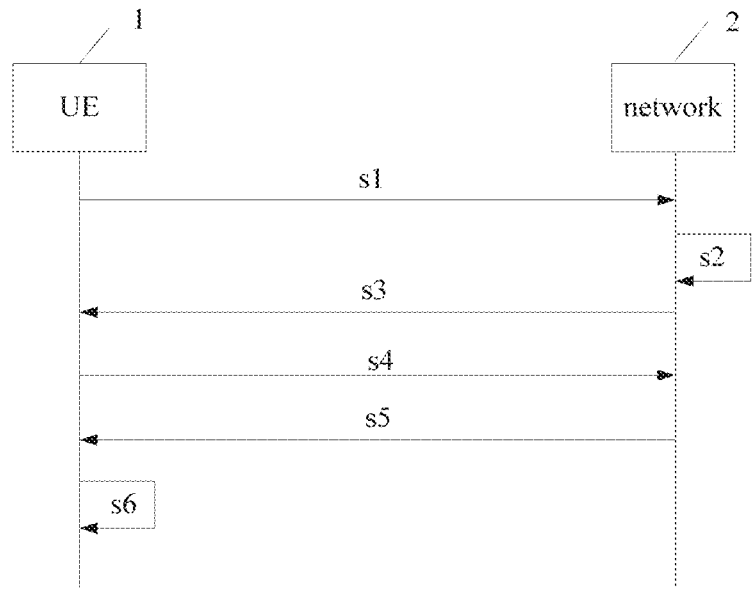
FIG. 7 is a diagram of signaling interaction in a typical application scenario according to an embodiment.

Referring to FIG. 7, in an application scenario, during DCI transmission between the UE 1 and the network 2, following steps may be performed.

First, the UE 1 performs s1, that is, after accessing the network through RRC signaling, the UE 1 transmits UE capability information to the network 2, wherein the UE capability information includes indication information indicating whether enhanced CCE is supported.

Afterward, if the UE 1 supports the enhanced CCE, and the network 2 determines to use the enhanced CCE to configure DCI, the network 2 performs s2, that is, configuring RRC signaling (for example, the first configuration information) for the UE 1. The RRC signaling may include multiple sets of parameter configuration. In each of the multiple sets of parameter configurations, the number of REGs included in a single CCE is different. Further, each set of parameter configuration may further include configuration information such as DCI format, CORESET and/or search space associated with the enhanced CCE.

Afterward, the network 2 performs s3, that is, transmitting the multiple sets of parameter configuration to the UE 1 through RRC signaling (for example, the first configuration information).

Afterward, the UE 1 performs s4, that is, transmitting a measurement report to the network 2, so that the network 2 determines the number of REGs (for example, 4 REGs) included in a single CCE when the enhanced CCE is used to schedule the UE.

Afterward, the network 2 performs s5, that is, transmitting control signaling (for example, the third configuration information) to the UE 1 through MAC CE, so that the UE 1 learns which set of parameter configuration the network 2 selects, for example, the number of corresponding CCEs for decoding DCI.

Finally, the UE 1 performs s6, that is, decoding the DCI using the parameter configuration selected by the network 2.

More details of working principles and working modes of the UE 1 and the network 2 in the application scenario as shown in FIG. 7 can be found in the above descriptions of FIG. 1, FIG. 2 and FIG. 4, and are not described here.

Figure 8:
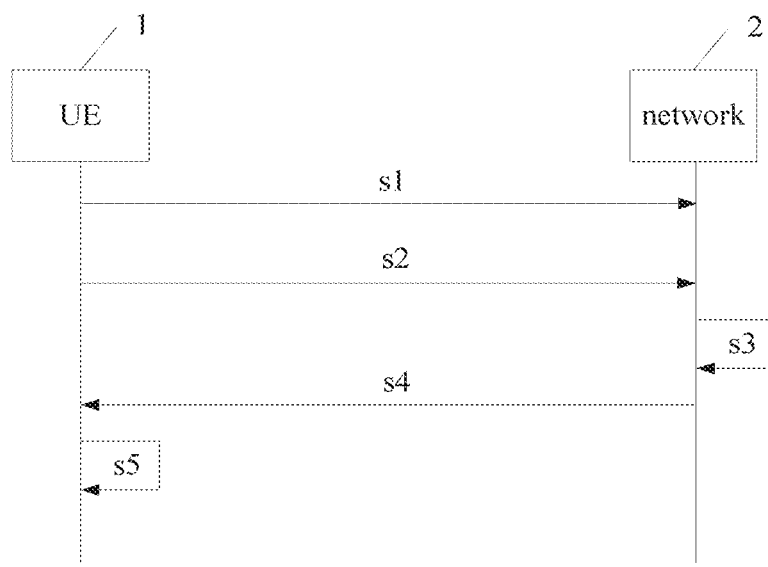
FIG. 8 is a diagram of signaling interaction in a typical application scenario according to an embodiment.

Referring to FIG. 8, in another application scenario, during DCI transmission between the UE 1 and the network 2, following steps may be performed.

First, the UE 1 performs s1, that is, after accessing the network through RRC signaling, the UE 1 transmits UE capability information to the network 2, wherein the UE capability information includes indication information indicating whether enhanced CCE is supported.

Afterward, the UE 1 performs s2, that is, transmitting a measurement report to the network 2, so that the network 2 determines the number of REGs (for example, 4 REGs) included in a single CCE when the enhanced CCE is used to schedule the UE.

Afterward, if the UE 1 supports the enhanced CCE, and the network 2 determines to use the enhanced CCE to configure DCI, the network 2 performs s3, that is, configuring for the UE 1 RRC signaling (for example, the second configuration information) for decoding DCI using the enhanced CCE based on the measurement report and the UE capability information. The RRC signaling may include the number of REGs included in a single CCE. Further, the RRC signaling may further include configuration information such as DCI format, CORESET and/or search space associated with the enhanced CCE.

Afterward, the network 2 performs s4, that is, transmitting configuration information related to the number of REGs included in the single CCE to the UE 1 through RRC signaling (for example, the second configuration information).

Finally, the UE 1 performs s5, that is, decoding the DCI using parameters configured by the network 2.

More details of working principles and working modes of the UE 1 and the network 2 in the application scenario as shown in FIG. 8 can be found in the above descriptions of FIG. 1, FIG. 3 and FIG. 4, and are not described here.

In an embodiment of the present disclosure, a storage medium having computer instructions stored therein is provided, wherein when the computer instructions are executed, any one of the above methods as shown in FIG. 1 to FIG. 4 is performed. The storage medium may include a computer readable storage medium. The storage medium may include a Read Only Memory (ROM), a Random Access Memory (RAM), a magnetic disk or an optical disk.

In an embodiment of the present disclosure, a base station including a memory and a processor is provided, wherein the memory has computer instructions stored therein, and when the processor executes the computer instructions, the above method as shown in FIG. 1 to FIG. 3 is performed. The base station may be an NR base station.

In an embodiment of the present disclosure, a terminal including a memory and a processor is provided, wherein the memory has computer instructions stored therein, and when the processor executes the computer instructions, the above method as shown in FIG. 4 is performed. In some embodiments, the base station may interact with the UE. In some embodiments, the terminal may be a UE.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A transmission control method for Downlink Control Information (DCI), comprising:
   receiving User Equipment (UE) capability information from a UE, wherein the UE capability information comprises indication information indicating whether enhanced Control Channel Element (CCE) is supported; and
   determining whether to use the enhanced CCE to schedule the UE based on the UE capability information, wherein if the enhanced CCE is used to schedule the UE, the number of Resource Element Groups (REGs) included in a single CCE is selected from a first set, if the enhanced CCE is not used to schedule the UE, the number of REGs included in a single CCE is selected from a second set, and the first set is different from the second set.

2. The method according to claim 1, wherein if it is determined that the enhanced CCE is used to schedule the UE, the method further comprises:
   transmitting first configuration information or second configuration information to the UE, to indicate for the UE that the enhanced CCE is used to schedule the UE.

3. The method according to claim 2, wherein the first configuration information comprises at least two elements in the first set, and the second configuration information comprises a single element in the first set.

4. The method according to claim 3, wherein the first configuration information further comprises a downlink control information format associated with each of the at least two elements, and the second configuration information further comprises a downlink control information format associated with the single element.

5. The method according to claim 3, wherein the first configuration information further comprises a control resource set and/or a search space associated with each of the at least two elements, and the second configuration information further comprises a control resource set and/or a search space associated with the single element.

6. The method according to claim 2, wherein after transmitting the first configuration information, the method further comprises:
receiving a measurement report from the UE;
determining the number of the REGs included in the single CCE based on the measurement report; and
transmitting third configuration information to the UE, so that the UE decodes the DCI based on the third configuration information, wherein the third configuration information comprises the number of the REGs included in the single CCE.

7. The method according to claim 2, wherein before transmitting the second configuration information, the method further comprises:
receiving a measurement report from the UE; and
determining the number of the REGs included in the single CCE based on the measurement report and the UE capability information.

8. The method according to claim 2, wherein the UE operates on a plurality of serving cells, and transmitting first configuration information or second configuration information to the UE comprises:
transmitting the first configuration information or the second configuration information to the UE on at least one of the plurality of serving cells.

9. A transmission control method for Downlink Control Information (DCI), comprising:
a User Equipment (UE) transmitting UE capability information to a network, wherein the UE capability information comprises indication information indicating whether enhanced Control Channel Element (CCE) is supported; and
if the network determines to use the enhanced CCE to schedule based on the UE capability information, using the enhanced CCE to decode the DCI,
wherein if the enhanced CCE is used to decode the DCI, the number of Resource Element Groups (REGs) included in a single CCE is selected from a first set, if the enhanced CCE is not used to decode the DCI, the number of REGs included in a single CCE is selected from a second set, and the first set is different from the second set.

10. The method according to claim 9, wherein before using the enhanced CCE to decode the DCI, the method further comprises:
receiving first configuration information or second configuration information from the network.

11. The method according to claim 10, wherein the first configuration information comprises at least two elements in the first set, and the second configuration information comprises a single element in the first set.

12. The method according to claim 11, wherein the first configuration information further comprises a downlink control information format associated with each of the at least two elements, and the second configuration information further comprises a downlink control information format associated with the single element.

13. The method according to claim 11, wherein the first configuration information further comprises a control resource set and/or a search space associated with each of the at least two elements, and the second configuration information further comprises a control resource set and/or a search space associated with the single element.

14. The method according to claim 10, wherein after receiving the first configuration information, the method further comprises:
transmitting a measurement report to the network, so that the network determines the number of the REGs included in the single CCE; and
receiving third configuration information from the network to decode the DCI, wherein the third configuration information comprises the number of the REGs included in the single CCE.

15. The method according to claim 10, wherein before receiving the second configuration information, the method further comprises:
transmitting a measurement report to the network, so that the network determines the number of the REGs included in the single CCE based on the measurement report and the UE capability information.

16. The method according to claim 10, wherein the UE operates on a plurality of serving cells, and receiving first configuration information or second configuration information from the network comprises:
receiving the first configuration information or the second configuration information from the network on at least one of the plurality of serving cells.

17. A storage medium having computer instructions stored therein, wherein when the computer instructions are executed, the method according to claim 1 is performed.

18. A base station comprising a memory and a processor, wherein the memory has computer instructions stored therein, and when the processor executes the computer instructions, the method according to claim 1 is performed.

19. A terminal comprising a memory and a processor, wherein the memory has computer instructions stored therein, and when the processor executes the computer instructions, the method according to claim 9 is performed.

20. A storage medium having computer instructions stored therein, wherein when the computer instructions are executed, the method according to claim 9 is performed.

* * * * *